(12) United States Patent
Bucher et al.

(10) Patent No.: US 12,259,107 B1
(45) Date of Patent: Mar. 25, 2025

(54) OPTIMAL SUNLIGHT DETECTION SYSTEM FOR SOLAR LUMINAIRES

(71) Applicant: Chien Luen Industries Co., Ltd., Inc., Oakland Park, FL (US)

(72) Inventors: Charles Bucher, Tampa, FL (US); Zachary Zauhar, Fort Lauderdale, FL (US); Mark Starling, Vero Beach, FL (US)

(73) Assignee: Chien Luen Industries Co., Ltd., Inc., Oakland Park, FL (US)

( * ) Notice: Subject to any disclaimer, the term of this patent is extended or adjusted under 35 U.S.C. 154(b) by 0 days.

(21) Appl. No.: 18/510,013

(22) Filed: Nov. 15, 2023

(51) Int. Cl.
 *F21S 9/03* (2006.01)
 *F21S 8/00* (2006.01)
 *F21V 21/08* (2006.01)
 *F21V 21/32* (2006.01)
 *F21V 23/04* (2006.01)
 *G01S 3/785* (2006.01)
 *F21W 131/109* (2006.01)

(52) U.S. Cl.
 CPC ............... *F21S 9/037* (2013.01); *F21S 8/033* (2013.01); *F21V 21/0824* (2013.01); *F21V 21/32* (2013.01); *F21V 23/04* (2013.01); *G01S 3/785* (2013.01); *F21W 2131/109* (2013.01)

(58) Field of Classification Search
 CPC ....... F21S 9/037; F21S 8/033; F21V 21/0824; F21V 21/32; F21V 23/04; F21W 2131/109; G01S 3/785
 See application file for complete search history.

(56) References Cited

U.S. PATENT DOCUMENTS

| | | |
|---|---|---|
| 4,110,049 A | 8/1978 | Younskevicius |
| 4,172,739 A | 10/1979 | Tassen |
| 5,217,296 A | 6/1993 | Tanner |
| 6,764,197 B1 | 7/2004 | Zemar |
| D495,817 S | 9/2004 | Bucher |
| D496,119 S | 9/2004 | Bucher |
| D497,022 S | 10/2004 | Bucher |
| D500,160 S | 12/2004 | Bucher |
| D500,161 S | 12/2004 | Bucher |
| D500,876 S | 1/2005 | Bucher |
| D528,243 S | 9/2006 | Bucher |
| 7,429,827 B2 * | 9/2008 | Richmond ............... F21S 10/04 |
| D600,161 S | 9/2009 | Li |
| 8,602,585 B1 | 12/2013 | Lowe |

(Continued)

FOREIGN PATENT DOCUMENTS

| | | |
|---|---|---|
| CN | 107543606 A | 1/2018 |
| WO | 2021007927 A1 | 1/2021 |

*Primary Examiner* — Zheng Song
(74) *Attorney, Agent, or Firm* — Brian S. Steinberger; Hilary F. Steinberger; Steinberger IP Law

(57) ABSTRACT

Systems, devices, and methods to provide systems, devices, and methods for providing an adequacy indicator meter having a visual and/or audio alarm, such as but limited to a blinking light, for measuring and determining the optimum placement for mounting a solar light fixture, such as a solar pathway and landscape light, solar spotlight, solar wall mounted light, solar security camera, and the like. a sunlight adequacy meter indicator for indicating an optimum charging location for the mount can include a LED (light emitting diode) which flash when the optimum charging condition is not being met by the mounting location of the solar light fixture.

13 Claims, 11 Drawing Sheets

(56) References Cited

U.S. PATENT DOCUMENTS

| | | | |
|---|---|---|---|
| 8,632,234 B1 | 1/2014 | Lowe | |
| 8,946,608 B2 | 2/2015 | Sherman | |
| 9,668,053 B1 | 5/2017 | Rivera | |
| 9,839,088 B1* | 12/2017 | Deaton | H05B 47/13 |
| 2002/0167587 A1 | 11/2002 | Ogasawara | |
| 2009/0284261 A1* | 11/2009 | Tozun | F21S 9/026 |
| | | | 324/414 |
| 2011/0017259 A1 | 1/2011 | Mann | |
| 2012/0057332 A1* | 3/2012 | Cohen | F21V 23/0464 |
| | | | 362/183 |
| 2012/0197486 A1* | 8/2012 | Elliott | G07C 5/008 |
| | | | 701/33.2 |
| 2012/0201015 A1* | 8/2012 | Robertson | F21L 14/04 |
| | | | 362/183 |
| 2012/0243213 A1* | 9/2012 | Chen | F21S 8/081 |
| | | | 362/183 |
| 2012/0327639 A1* | 12/2012 | Chen | F21S 9/035 |
| | | | 362/183 |
| 2013/0049609 A1* | 2/2013 | Browder | F21S 9/037 |
| | | | 315/159 |
| 2019/0137056 A1* | 5/2019 | Sreshta | H02J 7/0047 |
| 2022/0128224 A1* | 4/2022 | Palmer, Sr. | F21V 23/0435 |
| 2023/0092803 A1* | 3/2023 | McDonald | F21V 23/0471 |
| | | | 362/147 |

* cited by examiner

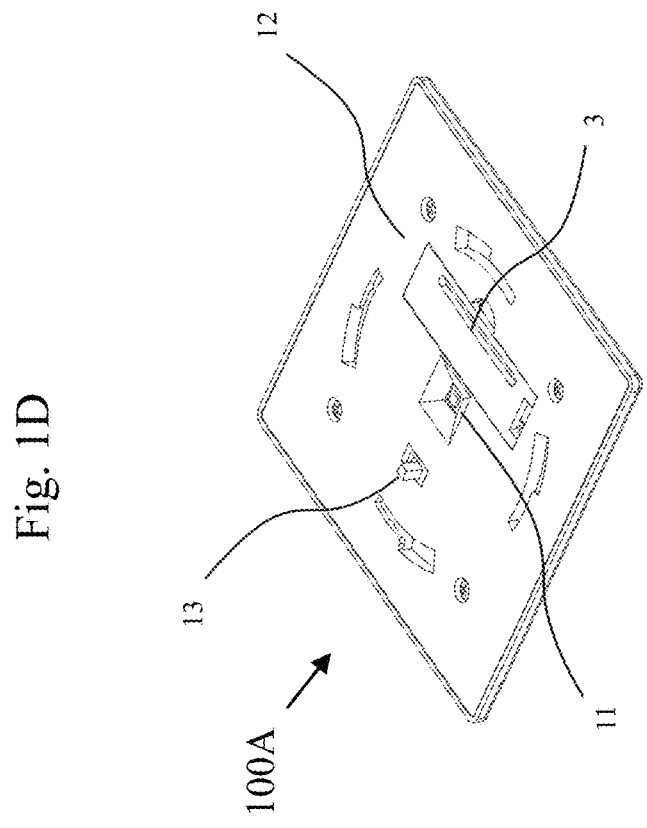
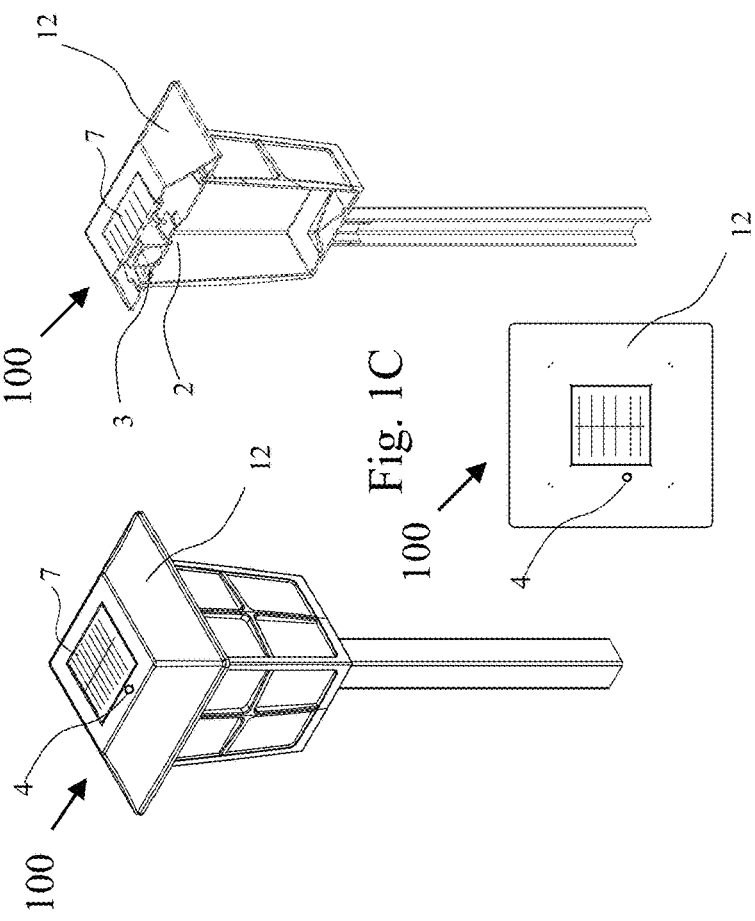
Fig. 1A
Fig. 1B
Fig. 1C
Fig. 1D

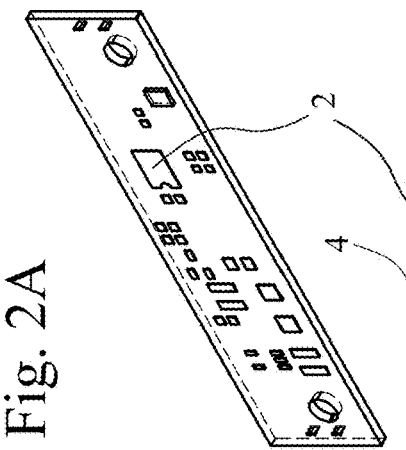
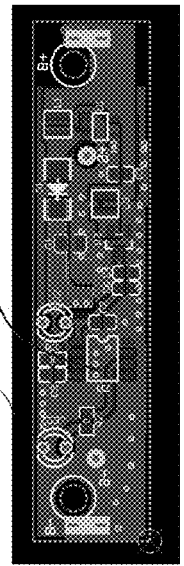
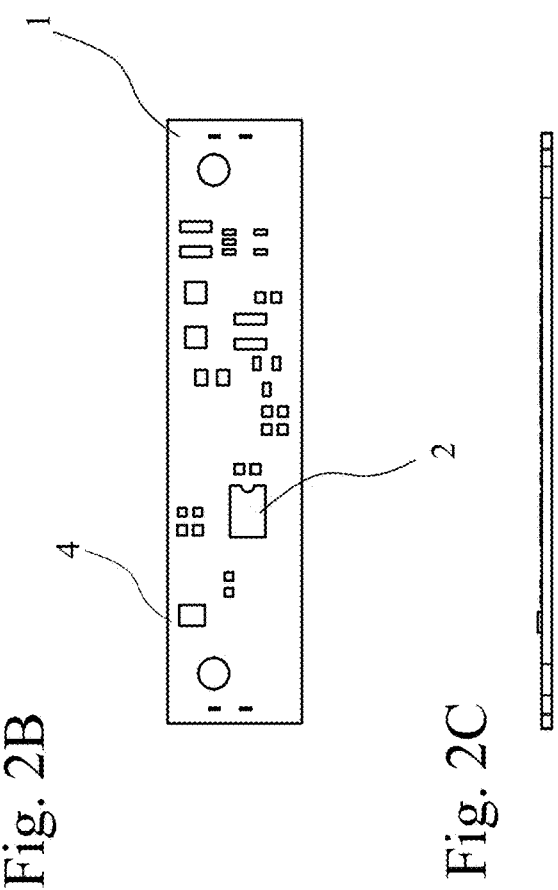
Fig. 2A  Fig. 2B  Fig. 2C  Fig. 2D

Fig. 2E.1 (Optional Switch)
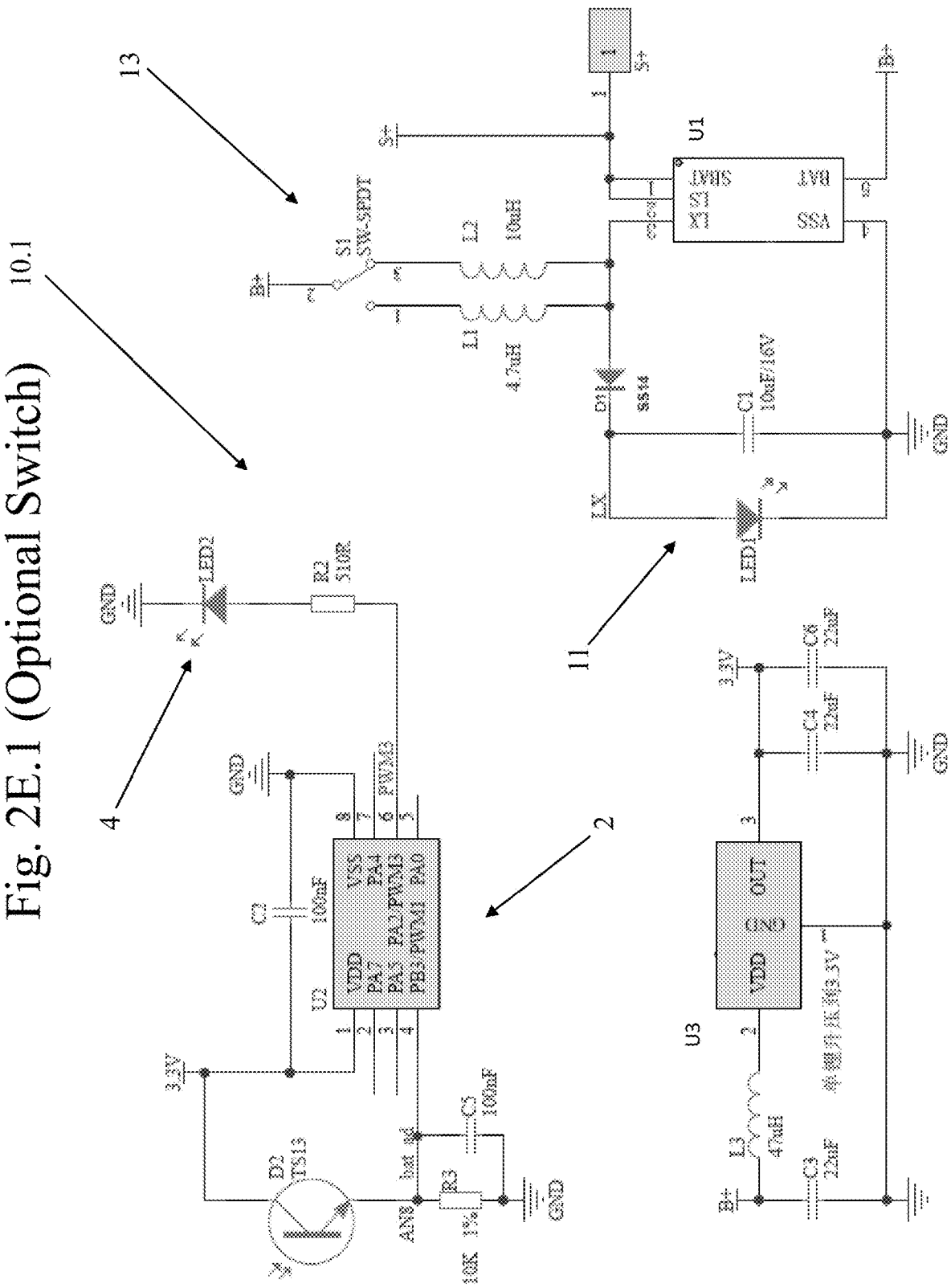

Smart Solar Fixture Function Flow Chart (NON-APP VERSION)

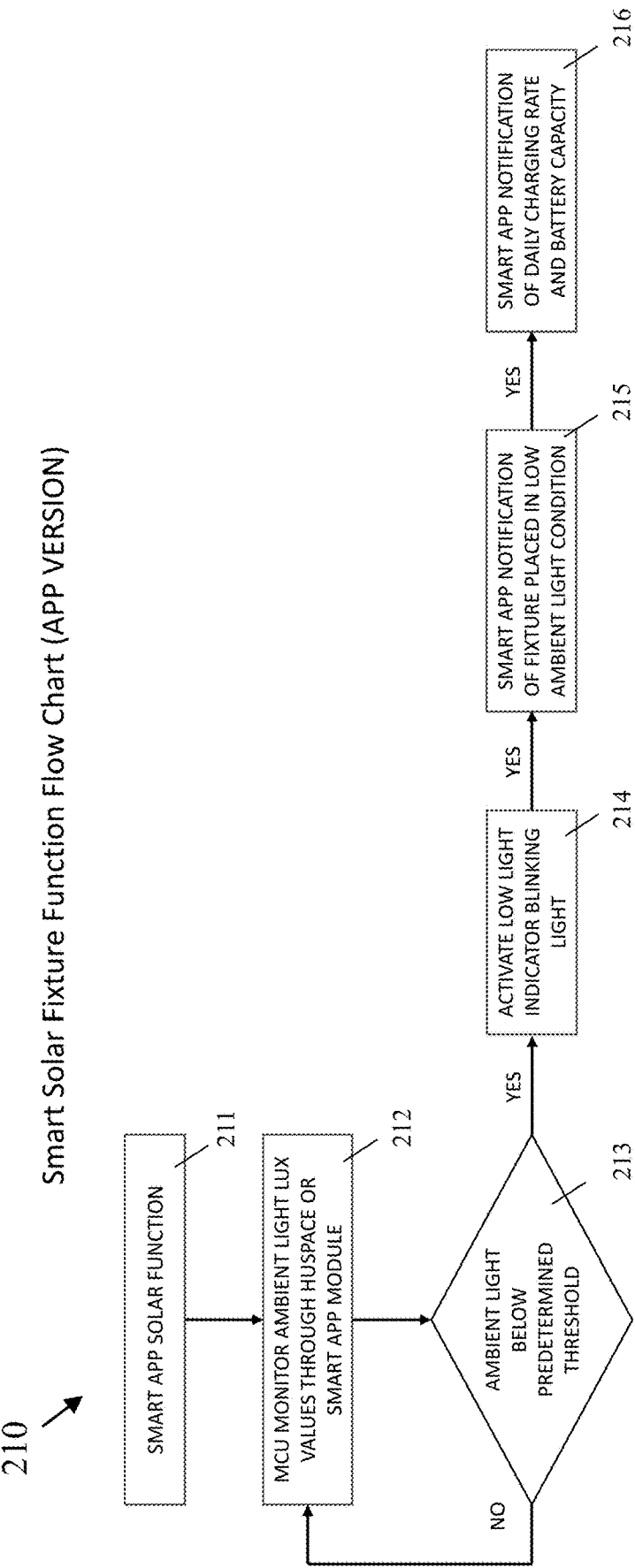

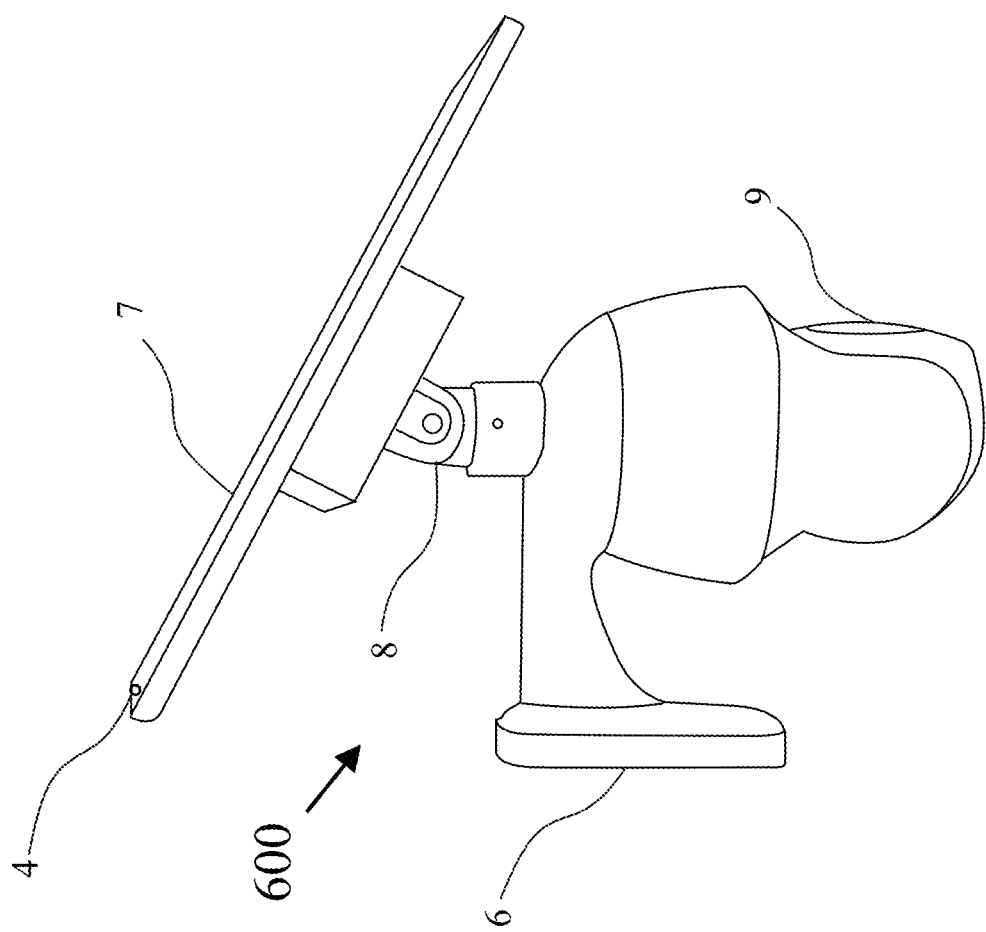

OPTIMAL SUNLIGHT DETECTION SYSTEM FOR SOLAR LUMINAIRES

FIELD OF INVENTION

This invention relates to solar lights, and in particular to systems, devices, and methods for providing an adequacy indicator meter having a visual and/or audio alarm, such as but not limited to a blinking light, for measuring and determining the optimum placement for mounting a solar light, such as a solar pathway and landscape light, solar spotlight, solar wall mounted light, solar security camera, and the like.

BACKGROUND AND PRIOR ART

Solar pathway and landscape lights are increasingly popular to be used along pathways that do not have access to hardwired power sources. See U.S. Pat. Nos. 8,602,585 and 8,632,234 to Lowe et al., and U.S. Pat. No. 9,668,053 to Rivera et al., which are assigned to the same assignee Chien Luen Industries Co., INC, which is the same assignee as the subject application, and which are all incorporated by reference. See U.S. Design Pat. D528,243, D495,817, D496,119, D497,022, D500,160, which are all assigned to Chien Luen Industries Co., INC, which is the same assignee as the subject application, and which are all incorporated by reference D600,161, D500,876 to Bucher et al., which are assigned to the same assignee A problem with these types of solar powered pathway and landscape lights is being able to position the lights in an optimum location for charging the solar powered batteries within the lights. Current installation instructions are for the installer to place the light in a location that gets direct sunlight. However, installers will often find out when it is too late, such as in the evening that the light was located in a shady location, by not illuminating as long as expected.

Another problem is that the popular solar pathway and landscape lights generally have only one setting for the light brightness, and do not allow the user to increase or decrease the light emitting intensity.

Solutions to optimize collecting the sunlight have often included solar tracking devices which have been in existence for many years for a rotatable solar collector that moves with the sun over time. See for example, U.S. Pat. No. 4,172,739 To Tassen and U.S. Pat. No. 8,946,608 to Sherman, which are both incorporated by reference. However, solar tracking devices would generally be too expensive and difficult to be used with popular solar lights, such as solar pathway lights, solar powered security lights, solar powered spot lights, and the like.

Thus, the need exists for solutions to the above problems with the prior art.

SUMMARY OF THE INVENTION

A primary objective of the present invention is to provide systems, devices, and methods for providing an adequacy indicator meter having a visual and/or audio alarm, such as but limited to a blinking light, for measuring and determining the optimum placement for mounting a solar light, such as a solar pathway and landscape light, solar spotlight, solar wall mounted light, solar security camera, and the like.

A secondary objective of the present invention is to provide systems, devices, and methods for providing an adequacy indicator meter having a visual and/or audio alarm, such as but limited to a blinking light, for measuring and determining the optimum placement for mounting a solar light, such as a solar pathway and landscape light, solar spotlight, solar wall mounted light, solar security camera, and the like.

A solar light fixture equipped with an integrated sunlight adequacy indicator as a meter. This innovative fixture incorporates a light detection circuit designed to continuously monitor ambient sunlight brightness levels. In instances where the detected sunlight level falls below a predetermined threshold, indicating insufficient sunlight for optimal charging, an LED (light emitting diode) is triggered to flash.

This flashing LED (light emitting diode) serves as a visual cue to the user, signaling the need to reposition the solar light fixture to a location with better sunlight exposure. By providing real-time feedback on installation suitability, this invention enhances the efficiency of solar light fixtures and aids users in ensuring optimal performance and longevity of the device.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIG. 1A is a perspective full exterior view of the solar pathway light embodiment using the printed circuit board (PCBA) of FIGS. 2A-2D.

FIG. 1B is a perspective partial cut-away view of the solar pathway light FIG. 1A.

FIG. 1C is a top view of the solar pathway light of FIG. 1A.

FIG. 1D is an underside view of the solar pathway light top part shown in FIG. 1C with an optional two setting switch to control the lumen output of the solar light.

FIG. 2A is a perspective view of a printed circuit board (PCBA) for the invention.

FIG. 2B is a front view of the PCBA of FIG. 1A.

FIG. 2C is a side view of the PCBA of FIG. 1A.

FIG. 2D is a PCB Layout of the PCBA of FIG. 1A.

FIG. 2E.1 shows the schematic circuitry for the PCBA of FIG. 2A with an optional switch to set the lumen output of the solar light.

FIG. 2G is a flow chart for the App version of the invention.

FIG. 6 shows an alternate embodiment of a wall mounted security camera.

DESCRIPTION OF THE PREFERRED EMBODIMENTS

Figure 2E:
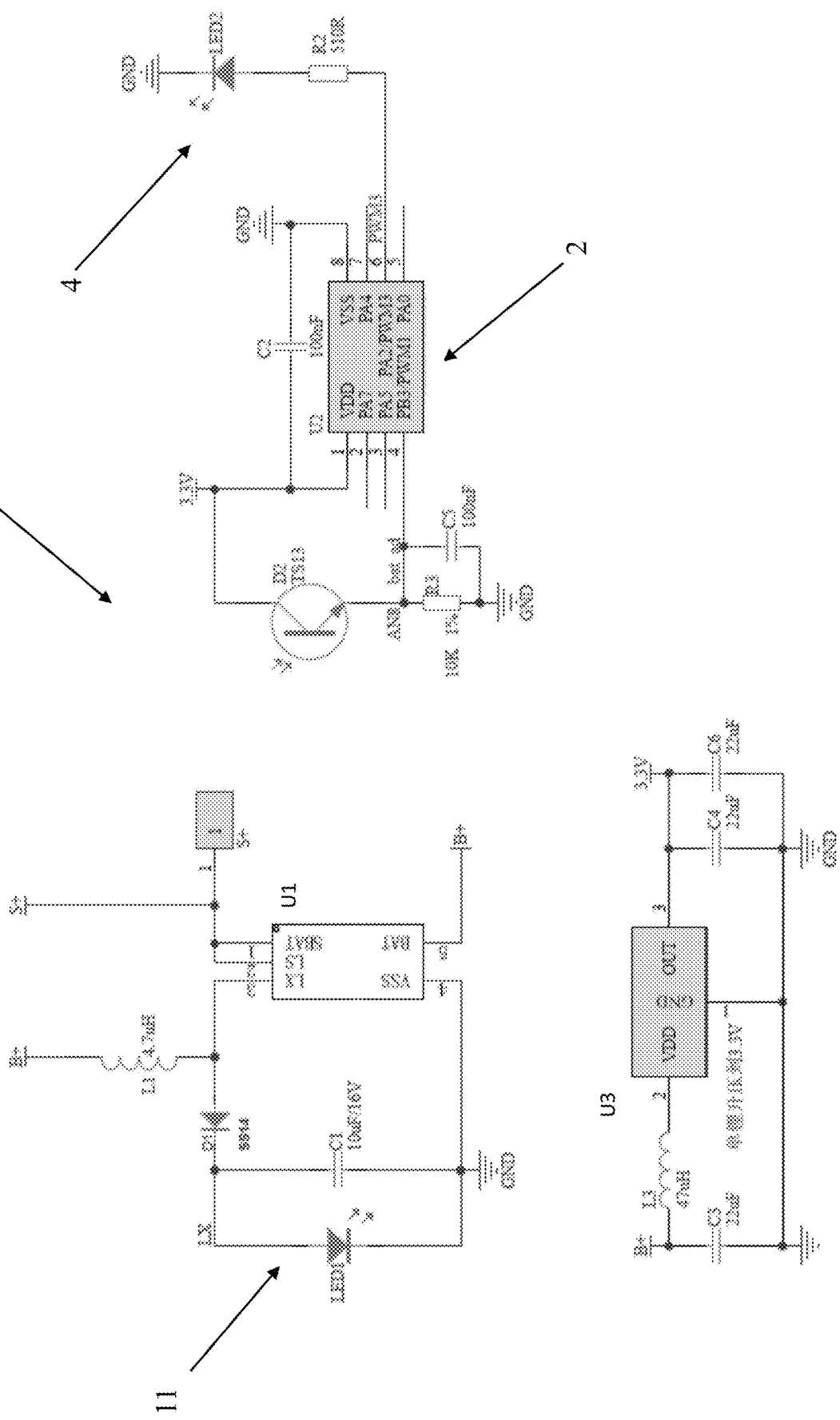
FIG. 2E shows the schematic circuitry for the PCBA of FIG. 2A.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

A list of components will now be described.
1. Printed Circuit Board (PCBA)
2. MCU (micro controller)
3. Battery
4. Illuminated Indicator (LED light emitting diode)
5. Solar Panel Wire
6. Solar Panel Wall Mount
7. Solar Panel
8. Adjustable Angle Joint for Solar Panel
9. Security Camera
10. PCBA Schematic
10.1 PCBA Schematic with Optional High/Low Switch
11. LED light
12. Solar Pathway Light Top Part
13. Optional High/Low Lumen Setting (Runtime) Switch
100 Pathway and Landscape Solar Light
100A Pathway and Landscape Solar Light with Optional High/Low Lumen Setting (Runtime) Switch
200 Smart Solar Fixture Function Flow Chart (NON-APP VERSION)
210 Smart Solar Function Flow Chart (APP VERSION)
250A, 250B, 250C Smart APP Version Illustration Examples
300 Solar Spot Light
400 Wall Mounted Solar Light
500 Solar Powered Security Camera
600 Alternate Solar Powered Security camera Pathway Solar Light Embodiment 100

FIG. 1A is a perspective full exterior view of the solar pathway light embodiment 100 that can be similar to the pathway lights referenced in the background section of this application. The solar pathway light 100 can use the printed circuit board (PCBA) 1 of FIGS. 2A-2D, and 2E. FIG. 1B is a perspective partial cut-away view of the solar pathway light of FIG. 1A. FIG. 1C is a top view of the solar pathway light 100 of FIG. 1A.

FIG. 1D is an underside view of the solar pathway light top part shown in FIG. 1C with an optional multi setting switch 13 to control the lumen output of the solar light. FIG. 1D shows a multi setting switch 13 for the sunlight adequacy indicator.

In addition to the innovative sunlight adequacy indicator, the solar light fixture can be equipped with a user-friendly switch 13, enabling customers to adjust the light output according to their needs. This feature can offer two settings: low and high (FIG. 1D), or more settings, such as three settings: low, medium, and high, each varying in lumens output and corresponding operational duration.

For example, the solar pathway light 100 may can be designed to output at approximately 20 lumens when the switch is set on high and approximately 10 lumens when the switch is set on low. This would provide a corresponding run time of approximately 4 to approximately 6 hours when set on high and approximately 8 to approximately 12 hours when set on low under full sunlight charge conditions. Of course, these lumen settings and run times can be varied by a large margin without deviating from the scope of this invention.

Figure 3C:
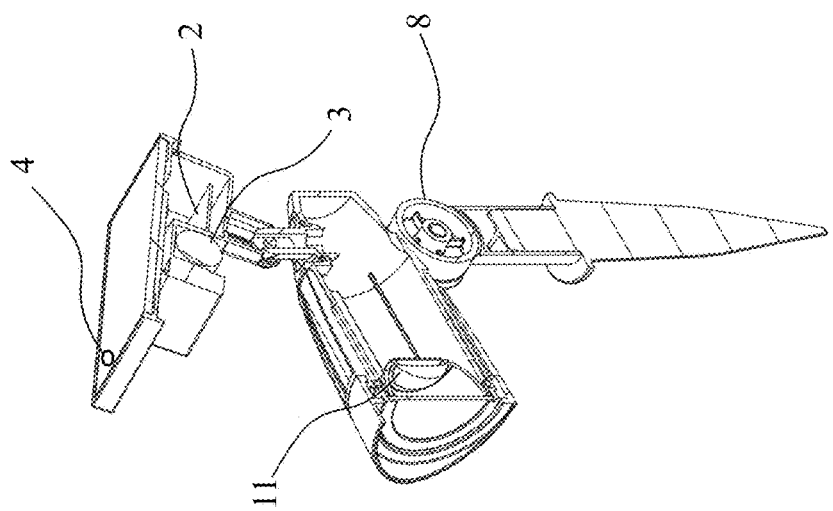
FIG. 3C is a partial cut-away view of a solar spot light embodiment of the invention.
Figure 3B:
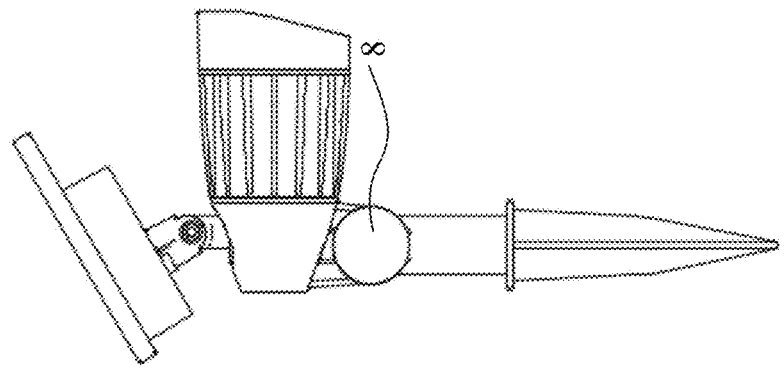
FIG. 3B is a side view of a solar spot light embodiment of the invention.
Figure 3A:
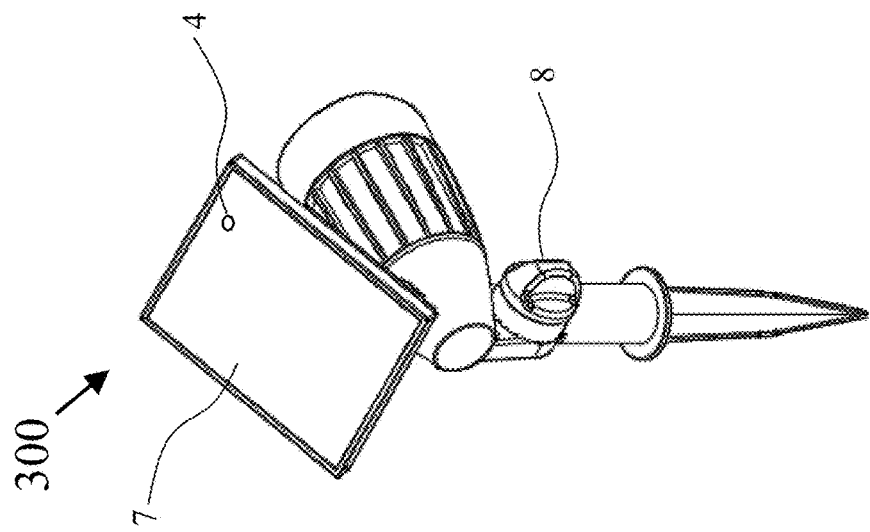
FIG. 3A is a perspective view of a solar spot light embodiment of the invention.

For example, the solar spot light 300 in FIG. 3A-3C can be designed to output approximately 500 lumens when the switch is set to low and at approximately 250 lumens when the switch is set to high and providing similar run times as described above. The switch can have more than two settings as mentioned above where the solar light can be set for example to approximately lumens, approximately 40 lumens, and approximately 45 lumens, each providing a corresponding operational duration.

Referring to FIGS. 1A-1D, 2A-2D, and 2E, the pathway light 100 can include a MCU (micro controller) 2 connected to a battery 3 and illuminated indicator (LED) light emitting diode 4 which are part of the PCBA (printed circuit board) 1.

FIG. 2E shows a schematic 10 for the for solar pathway light 100. The phototransistor D2 is a type of photoelectric device that converts light energy into electrical energy. It is a bipolar transistor that is sensitive to light. When light falls on the base of the transistor, it causes the current to flow between the collector and emitter. Its collector is connected to an approximately 3.3V source, and its emitter is coupled to the pin 4 (PB3) input of microcontroller (MCU) 2. This emitter is also linked to resistor R3, which is in parallel with capacitor C5, both leading to ground. The resistance of the phototransistor increases as the light intensity decreases, thereby reducing the current through the collector and emitter. As the resistance from phototransistor D2 increases due to lower sunlight, the voltage at the PB3 input pin decreases. Once this voltage decreases below a specific threshold, MCU 2 detects this change.

In response, MCU 2 can modulate the output of pin 6 (PWM3) to control the blinking rate of an LED 4. When the sunlight is greater than the specific threshold, the LED is off. When the sunlight is lower than the specific threshold, the LED begins blinking, thereby alerting the user to lower than optimal sunlight conditions.

U2 functions as a voltage multiplier circuit. Utilizing an inductor L3 and a capacitor C3, it amplifies the battery voltage, B+, from an initial value of around 1.2V to a higher value of 3.3V (enough to illuminate the light source LED 11). U1 serves as a regulator, managing the energy inputs from the solar panel, denoted as S+. Its primary function is to charge the battery, B+. When exposed to daylight and drawing energy from the solar panel connected to its pins 1 and 2, U1 channels this power to pin 5, facilitating the charging of battery 3. Conversely, during nighttime, U1 modulates the output from pin 3 to illuminate LED1.

FIG. 1D depicts a bottom perspective view of the solar pathway light's top part shown in FIG. 1C, featuring an optional switch 13 (High/Low Lumen Setting Switch) with dual settings to regulate the solar light's luminosity. This switch allows the user to select between a high and a low light output, for example emitting approximately 20 lumens and approximately 10 lumens respectively. This feature is particularly advantageous for users who wish to extend the light's runtime when the light is positioned in areas with limited sunlight exposure.

FIG. 2E.1 presents a schematic representation 10.1 of the pathway light system, designated as 100A (FIG. 1D), which incorporates an optional switch 13. Within the circuitry of U1, there exists a switch 13 that serves the purpose of diverting current flow between the B+ source and either inductor L1 or L2. The variation in inductance between L1 and L2 controls the current supplied to the LED, consequently resulting in the adjustment of luminous output-offering both higher and lower lumen levels. This luminosity control mechanism subsequently corresponds to varying operational durations.

Figure 2F:
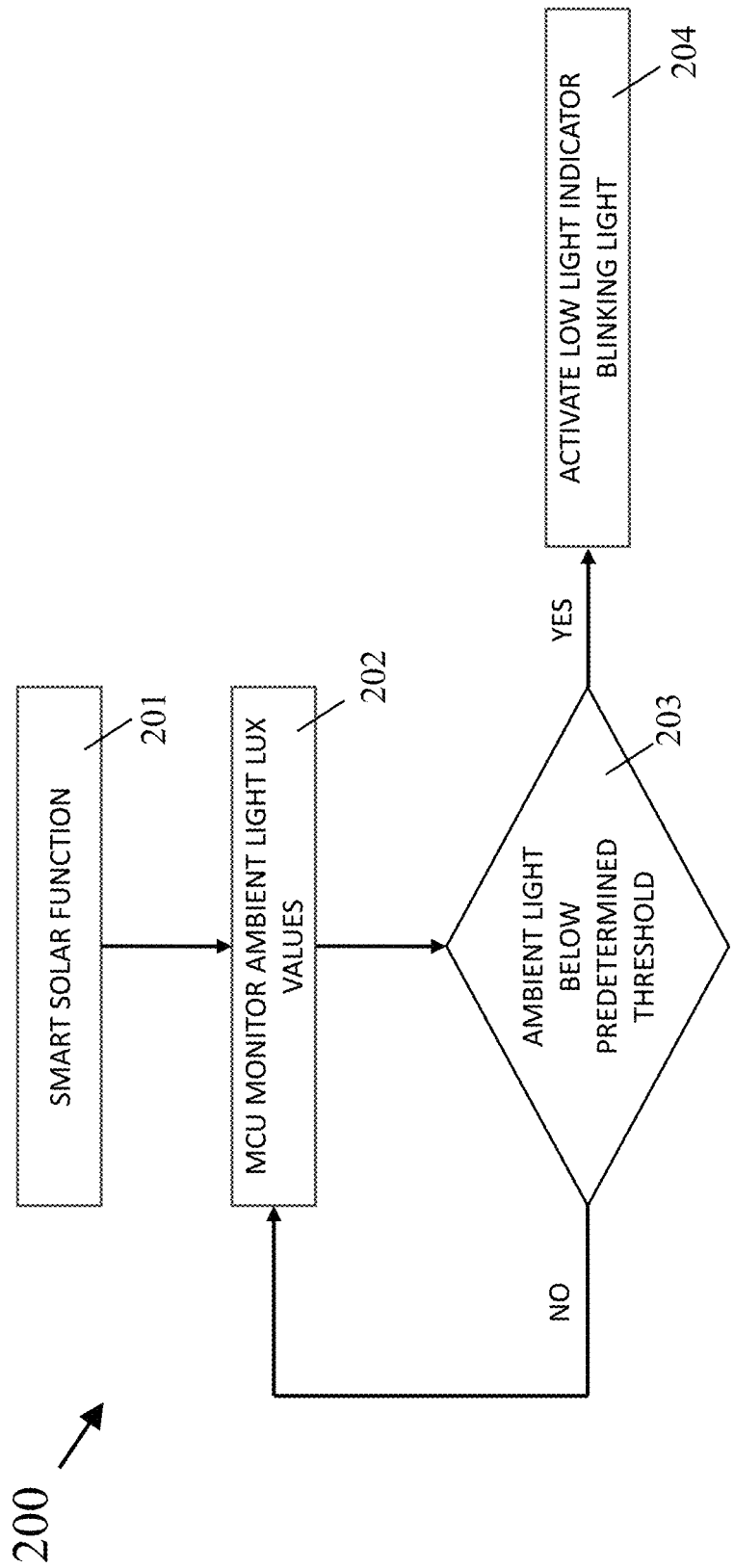
FIG. 2F is a flow chart for the non-App version of the invention.

FIG. 2F is a flow chart for the non-App version 200 of the invention.

Referring to FIGS. 1A-1C, 2A-2F, the core functionality 201 of the solar light fixture's sunlight adequacy indicator is governed by an embedded microcontroller 2 (MCU). This MCU 2 is interfaced with an analog input that is directly connected to monitor the ambient light levels from the phototransistor D2 circuit described above (light detection circuit). Alternately, the solar panel could be used to detect the light intensity and be used as the input to the MCU. Under standard operating conditions, with adequate sunlight, the light detection circuit produces a characteristic voltage output.

The MCU 2 can be programmed to recognize this optimal voltage level and continuously compare it against the real-time voltage output of the light detection circuit. If the monitored voltage output falls below a predetermined threshold, in this instance, approximately 50% of the typical output under sunny conditions, the MCU 2 activates a specific output channel connected to an LED 4. This results in the LED 4 flashing 204, thereby providing a clear and immediate visual indication to the user that the current physical installation location of the solar light fixture is experiencing suboptimal sunlight conditions.

Through this mechanism, the user is empowered to make informed decisions about relocating the fixture to ensure maximum energy absorption and efficient operation. When there is no flashing (no blinking light), the location of the solar light fixture can be considered acceptable.

In this particular embodiment, the LED 4 may be turned on for approximately 0.3 seconds and then off for approximately 0.7 seconds, thereby resulting in a visual indication once a second.

The advantage of this is two-fold. The blinking light 4 will get the user's attention and the illuminating for approximately 0.3 seconds every second will result in less power consumption, which is an advantage for solar powered devices. Since the LED light 4 comes on in response to an inadequate location for installation, the preferred color of the LED 4 is red. However, other colors such as yellow, green, white, and the like can be used without deviating from the scope of this invention. While not preferred, the logic of the circuit could be reversed so that the LED 4 turns on in response to being place in an optimal location for installation and in such case, the LED 4 could be a different color, such as a green color.

While a flashing light 4 is described above for the notification, other indicators may be used, such as an audible alarm, without deviating from the scope of this invention.

For the solar pathway light, 100, the fixture is always perpendicular to the ground. However, the solar spot light 300, may be positioned at different angles to light up the intended target and the adjustable solar panel may be positioned towards the sunlight for a more optimal position while observing the solar adequacy indicator.

The user may position the solar light fixture, designated as 100, at a preferred location within the yard. By monitoring the fixture's solar adequacy sensor, the user can assess the adequacy of sunlight at the chosen spot. A flashing light from the sensor suggests inadequate sunlight exposure. In response, the user might opt to shift the fixture to a location with better sunlight until the flashing stops, indicating an optimal position. Alternatively, if the user wishes to maintain the fixture at the initially selected location, they can modify the runtime switch to a setting that provides a less intense illumination but prolongs the light's duration. In this section we use the term "Runtime" switch whereas in the previous sections, we used the term Hi/Low switch.

Figure 5B:
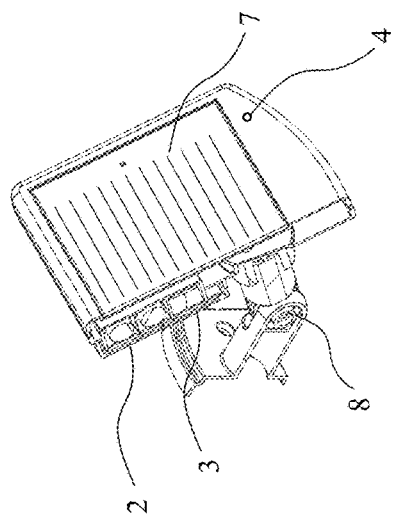
FIG. 5B is a partial cut-away view of the solar mounted security camera embodiment of FIG. 5.
Figure 5C:
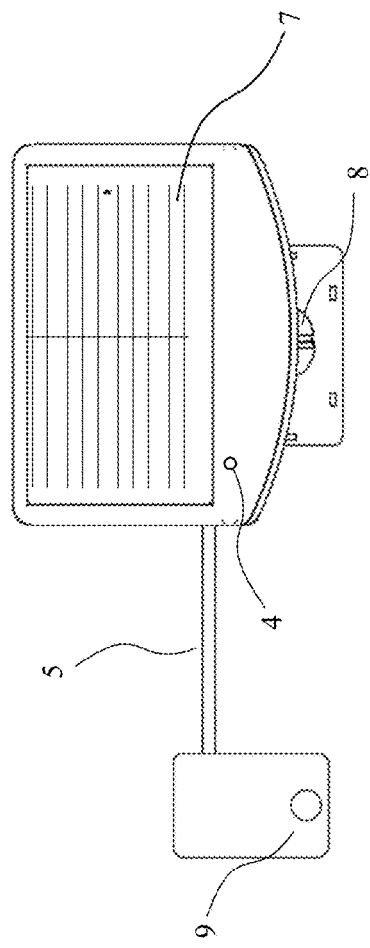
FIG. 5C is a front view of a solar wall mounted security camera embodiment of the invention.
Figure 5A:
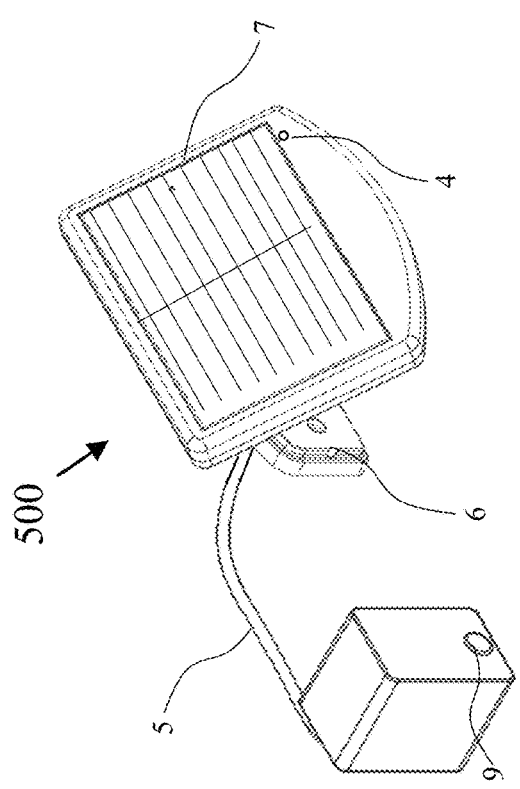
FIG. 5A is a perspective view of a solar wall mounted security camera embodiment of the invention.

Solar light fixture 100 could be modified with a remote solar panel 7 and wiring 5 as showing in FIG. 5A. This would allow the solar panel to be positioned for optimal sunlight collection.

FIG. 2G is a flow chart for the Smart Phone App version 210 of the invention. Component 211 corresponds to 201, component 212 corresponds to 202, component 213 corresponds to 203, component 214 corresponds to 204.

Once the device detects that it is placed in a lower than optimal location, it can activate the blinking light to indicate a low light condition, 214, notify the user via the smart app of this low light condition 215, and show via the smart app the daily charging rate and battery capacity 216.

In further embodiments of the invention, the solar light fixtures 100, 200, 300, 400, 500, 600 can be enhanced with Bluetooth communication capabilities, allowing it to seamlessly interface with a dedicated smartphone app 11A-11C. This app 11A-11C serves as an advanced interface for users to gain insights into the sunlight exposure of their solar light fixture 100, 300, 400 and solar security camera 500, 600. Upon establishing a Bluetooth connection between the solar light 100, 200, 300/camera 500, 600 and the smartphone, the app 11A-11C retrieves data stored by the MCU pertaining to the amount of sunlight received over specific intervals.

This data is then processed and presented in the form of a graphical representation, showcasing the solar irradiance over time. For instance, users can view a daily breakdown of sunlight exposure, visualized as a graph, for the past week. This not only provides a real-time indication of the current sunlight quality but also offers a historical perspective, allowing users to understand patterns and make informed decisions about the placement of their solar light fixture. The integration of this app-based interface elevates the user experience, offering a more comprehensive understanding of the device's performance and environmental conditions.

Figure 2J:
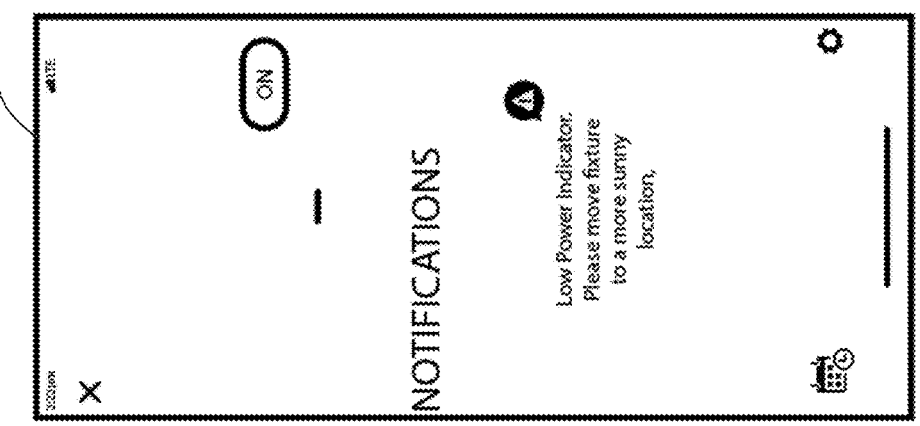
FIG. 2J is a view of the App screen showing notifications related to performance deficiencies for a particular solar light equipped with this invention.
Figure 2I:
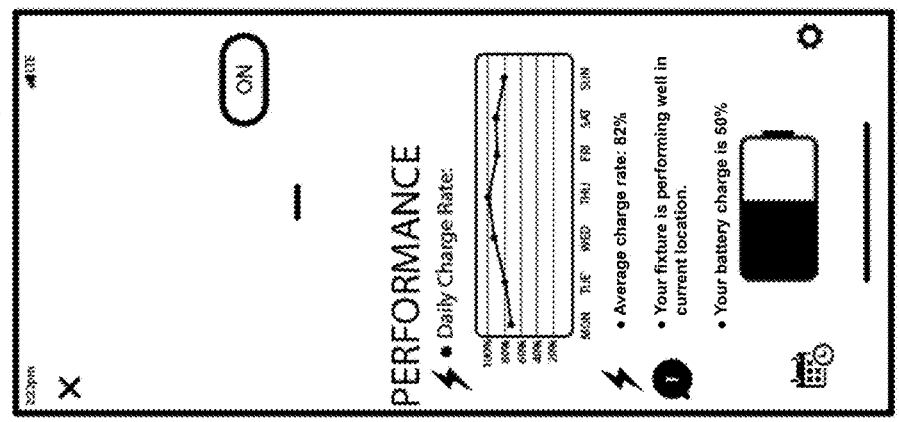
FIG. 2I is a view of the App screen showing the performance screen for a selected solar light equipped with this invention.
Figure 2H:
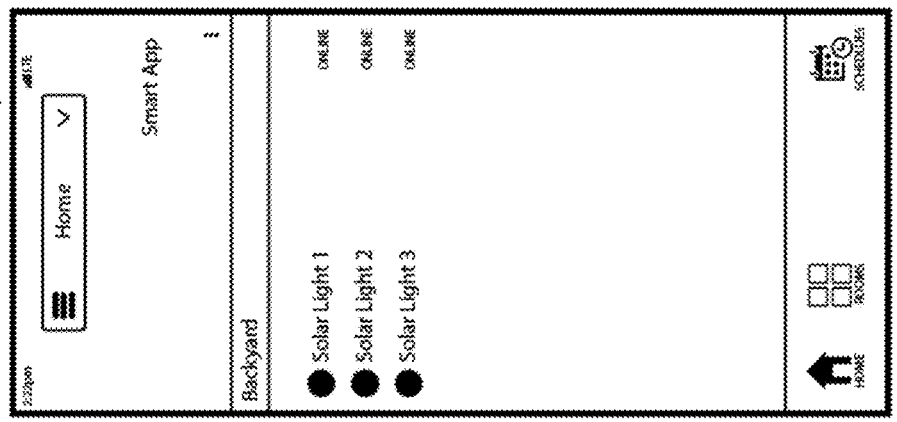
FIG. 2H is a view of the App screen showing the various solar lights equipped with this invention.

FIG. 2H is a view of the App screen 250A showing the various solar lights equipped with this invention. Within this section of the App, customers are able to add or remove solar lights (and solar security cameras), and make selections for accessing detailed information. Upon selection, App screen 250B is displayed, providing comprehensive performance data pertinent to the chosen device. For instance, FIG. 2I showcases a screen dedicated to a solar pathway light, presenting critical insights such as the daily charge rate represented as a percentage and a performance summary with recommendations regarding usage. For instance, if the fixture is not receiving adequate sunlight, the App can suggest repositioning it or adjusting its runtime settings if equipped with the selector switch.

FIG. 2I is a view of the App screen 250B showing the performance screen for a selected solar light equipped with this invention.

The smart app platform offers performance features that are indicated in several different ways to assist the end user of the product to get the most efficient solar light experience possible out of their unit. The three ways of keeping track of your solar lights efficiency are indicated in the app interface as daily charge rate, average charge rate and current battery charge percentage. These three features will notify the user via the app whether or not their solar light is performing well in its current location outside.

The daily charge rate feature can be displayed as a graph with every day in the week along with percentage rates indicating on that specific day how much your fixture batteries were charged. For example, if the graph shows approximately 80% on Monday that equates to your batteries being charged at approximately 80% of their capacity.

The average charge rate feature is displayed as a percentage indicating the average rate of charge your solar light batteries are receiving over the span of one week. For example, this percentage will equate to 7 full days of operation Monday through Sunday and indicate to the user the average charge over a weeks period of time 0 out of 100%.

The battery charge feature simply advises the user via the app interface the real time percentage of how much the battery is charged at any point in time.

FIG. 2J is a view of the App screen 250C showing notifications related to performance deficiencies for a particular solar light equipped with this invention. When the solar pathway light experiences sub-optimal performance, the App can present a notification screen, as seen in FIG. 2J, with recommendations regarding usage as described above.

Solar Spot Light 300

FIG. 3A is a perspective view of a solar spot light embodiment 300 of the invention. FIG. 3B is a side view of the solar spot light embodiment 300 of FIG. 3A. FIG. 3C is a partial cut-away view of the solar spot light embodiment 300 of FIG. 3A. The spot light embodiment 300 can include prior art features found in U.S. Pat. No. 6,764,197 to Zemar, which is incorporated by reference.

Referring to FIGS. 3A-3C, the spot light embodiment 300 can include the illuminated LED (light emitting diode) indicator 4 on a pivotable solar panel with MCU 2, battery 3 and directional LED (light emitting diode) spot light 11. An adjustable angle joint 8 on a ground engaging stake can be used to adjust the direction of the spot light 11.

The position of the spot light and solar panel can 'be adjusted independently to allow the user to point the light at the intended target and independently position the solar panel for a more optimal position to collect power from the sunlight.

Wall Mounted Solar Light 400

Figure 4A:
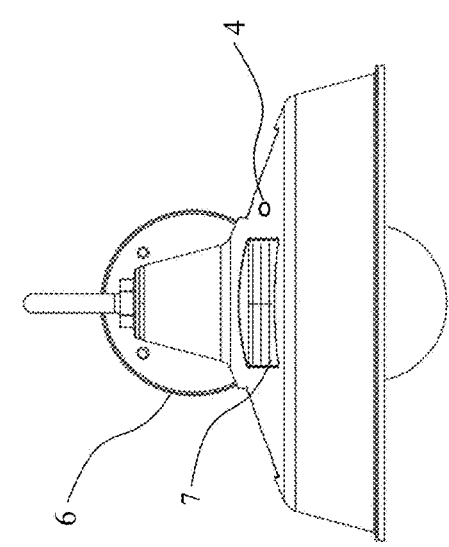
FIG. 4A is a perspective view of a solar wall mount light embodiment of the invention.
Figure 4B:
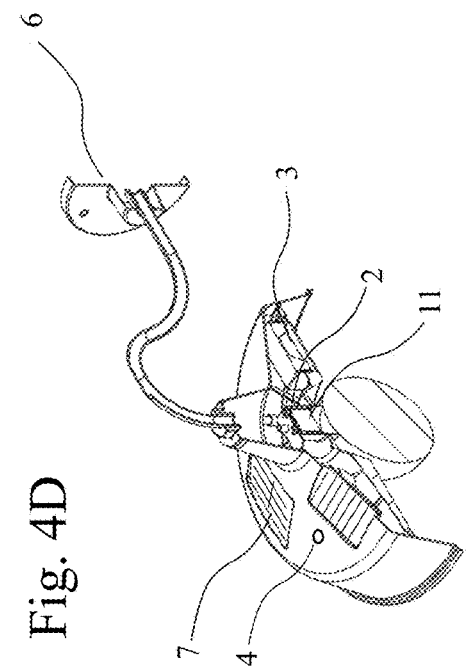
FIG. 4B is a front view of a solar wall mount light embodiment of the invention.
Figure 4C:
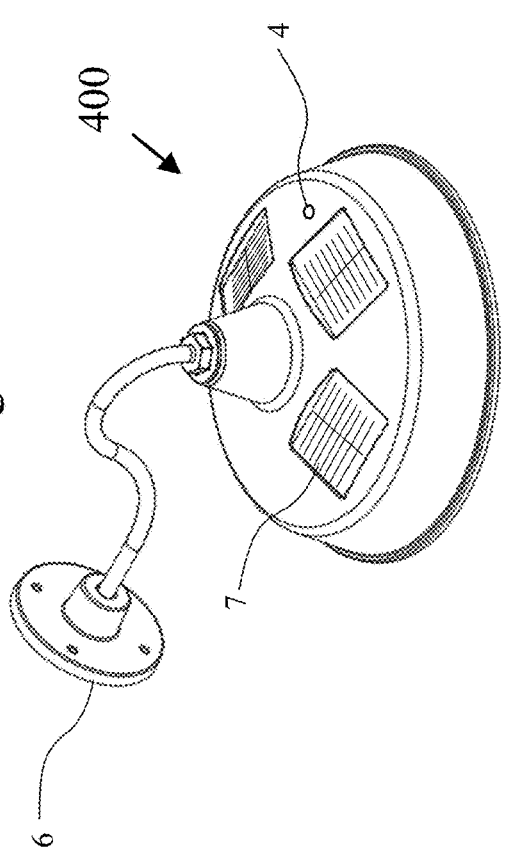
FIG. 4C is a side view of a solar wall mount light embodiment of the invention.
Figure 4D:
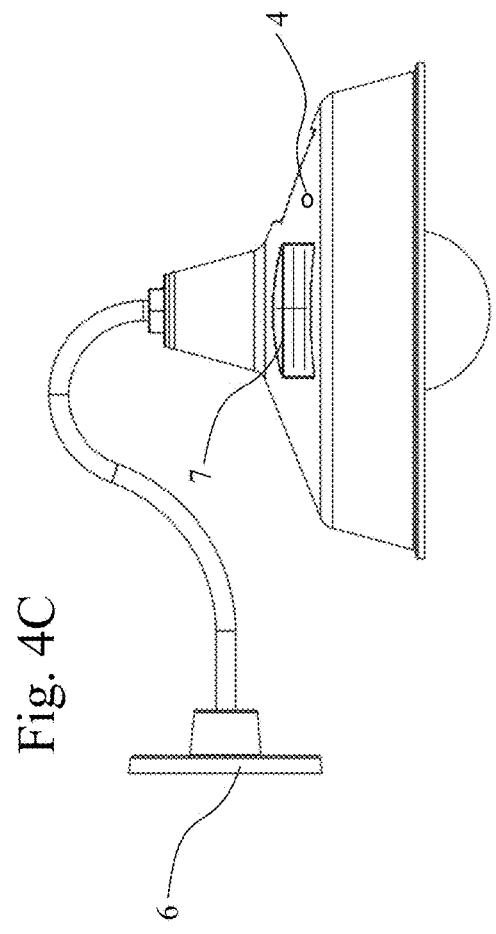
FIG. 4D is a partial cut-away view of a solar wall mount light embodiment of the invention.

FIG. 4A is a perspective view of a solar wall mounted light embodiment 400 of the invention. FIG. 4B is a front view of the solar mounted light embodiment 400 of FIG. 4A. FIG. 4C is a side view of the solar mounted light embodiment 400 of FIG. 4A. FIG. 4D is a partial cut-away view of the solar mounted light embodiment 400 of FIG. 4A.

The solar mounted light embodiment 400 can include components such as those referenced in U.S. Pat. No. 5,217,296 to Tanner, which is incorporated by reference.

The user can mount the solar light fixture, identified as 400, at a desired spot on the wall by mount 6. By observing the integrated solar adequacy sensor on this fixture, the user can gauge the sunlight's effectiveness at that particular location. If the sensor produces a flashing signal, it denotes insufficient sunlight. Given this feedback, the user may contemplate relocating the fixture to a wall spot receiving enhanced sunlight, with the cessation of flashing indicating a more suitable placement. However, if the user is inclined to keep the fixture in its original position, an adjustment can be made to the runtime switch, enabling a mode with dimmer light output but an extended illumination period.

Solar Powered Security Camera 500

FIG. 5A shows a perspective view of a wall mounted security camera embodiment 500. FIG. 5B shows a perspective view of a wall mounted security camera embodiment 500 of FIG. 5A. FIG. 5C shows a front view of a wall mounted security camera embodiment 500 of FIG. 5A.

The user can mount the security camera 9 in the desired location and then position the solar panel 7 in a separate location. By observing the integrated solar adequacy sensor on this fixture, the user can gauge the sunlight's effectiveness at that particular location. If the sensor produces a flashing signal, it denotes insufficient sunlight. Given this feedback, the user may contemplate relocating the fixture to a wall spot receiving enhanced sunlight, with the cessation of flashing indicating a more suitable placement.

The solar panel may also be repositioned using the adjustable angle joint 8 to further optimize the position of the panel relative to the sunlight.

The security camera with solar panel can be similar to the camera and solar panel, shown and described in U.S. Published Patent Application 2002/0167587 to Ogasawara, which is incorporated by reference, which is shown using the invention in FIG. 6.

Referring to FIGS. 6, a SOLAR POWERED SECURITY CAMERA 600 can include a solar panel wall mount 6 with an adjustable angle joint 8 for the solar panel 7, with an illuminated indicator LED (light emitting diode) 4.

The user can mount the security camera 9 in the desired location and position the solar panel 7 via adjustable angle joint 8 for an optimal position relative to the sunlight. By observing the integrated solar adequacy sensor on this fixture, the user can gauge the sunlight's effectiveness at that particular location. If the sensor produces a flashing signal, it denotes insufficient sunlight. Given this feedback, the user may contemplate relocating the fixture to a wall spot receiving enhanced sunlight, with the cessation of flashing indicating a more suitable placement.

Normal operation in high sunlight locations is 8 hours of light output with the runtime switch set to the high lumen output setting. The user can also get 8 hours versus 4 hours in low sunlight locations with the switch set to low lumen output. OR 16 hours versus 8 hours in high sunlight locations with the switch set to low lumen output.

This adjustable feature, coupled with the sunlight adequacy indicator, empowers users to optimize the light's performance based on real-time sunlight conditions. For instance, if the indicator signals suboptimal sunlight exposure, users can conveniently switch to the low light output setting, thereby maximizing the operational duration of the light even in locations with lower sunlight availability.

This synergy between adjustable light output and real-time sunlight monitoring significantly enhances the user experience and the overall efficiency of the solar light fixture.

With the solar panel, the solar panel can provide the power to the blinking light even in low battery conditions.

While the preferred embodiments describe a flashing LED light indicator 4 as a visual meter indicator, the indicator can include an audio indicator, such as but not limited to a beeping sound, noise, and the like.

While adjustment mechanisms in the embodiments disclose pivotable joints, the adjustment mechanisms can include additional mechanisms, such as but not limited to hinges, ball in socket mechanisms, bendable spring arms, and the like.

The term "approximately"/"approximate" can be +/−10% of the amount referenced. Additionally, preferred amounts and ranges can include the amounts and ranges referenced without the prefix of being approximately.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A solar powered light fixture indicating system for optimizing a mounting location, comprising:
   a light fixture with solar panel, battery being charged by the panel, with a light source, and a mount for the light fixture; and
   a sunlight adequacy indicator circuit in the fixture for indicating an optimum charging condition for the battery, the circuit including a phototransistor configured to detect ambient sunlight levels, a microcontroller (MCU) interfaced with the phototransistor to monitor sunlight levels, and an LED (light emitting diode) controlled by the MCU, the LED configured to activate when the detected sunlight level falls below a predetermined threshold, thereby indicating a suboptimal charging condition for the battery, wherein locating the mount for the fixture changes the charging condition for the battery.

2. The solar powered fixture indicating system, of claim 1, wherein the light fixture is selected from the group consisting of a solar pathway and landscape light, a solar powered spotlight, and a solar powered wall mounted light.

3. The solar powered fixture indicating system of claim 1, wherein the mount includes: a pivoting mechanism selected from the group consisting of a hinge and a ball in socket, wherein the pivoting mechanism is for allowing the light fixture to move relative to a hinge mechanism.

4. The solar powered fixture indicating system of claim 1, wherein the phototransistor is configured to output a voltage proportional to intensity of the ambient sunlight, and the MCU is programmed to compare the output voltage to a reference voltage corresponding to the predetermined sunlight threshold, activating the LED to flash when the output voltage is below the reference voltage.

5. The solar powered fixture indicating system of claim 1, wherein LED (Light Emitting Diode) flashes when the optimum charging condition is not met, and the LED (Light Emitting Diode) is turned on for approximately 0.3 seconds and then turned off for approximately 0.7 seconds during a flash cycle.

6. The solar powered fixture indicating system of claim 1, wherein the sunlight adequacy indicator includes an LED (Light Emitting Diode) which flashes when the optimum charging condition is not met and the LED (Light Emitting Diode) is turned on for approximately 0.3 seconds and then turned off for approximately 0.7 seconds during a flash cycle.

7. A solar powered light fixture mount monitoring meter system for optimizing charging location of the solar powered light fixture, comprising:
   a light fixture with a light source powered by a solar panel, having a mount for locating the light fixture; and
   a sunlight adequacy meter indicator with a circuit for indicating an optimum charging location for the mount, the circuit including a phototransistor configured to detect ambient sunlight levels, a microcontroller (MCU) interfaced with the phototransistor to monitor sunlight levels, and an LED (light emitting diode) controlled by the MCU, the LED configured to activate when the detected sunlight level falls below a predetermined threshold, thereby indicating a suboptimal charging condition for the battery.

8. The solar powered light fixture mount monitoring meter system of claim 7, wherein the solar fixture is selected from the group consisting of a solar powered pathway and landscaping light, a solar powered spotlight and a solar powered wall mounted light.

9. The solar powered light fixture mount monitoring meter system of claim 7, wherein the phototransistor is configured to output a voltage proportional to intensity of the ambient sunlight, and the MCU is programmed to compare the output voltage to a reference voltage corresponding to the predetermined sunlight threshold, activating the LED to flash when the output voltage is below the reference voltage.

10. A solar-powered light fixture indicating system for optimizing a mounting location, comprising:
   a light fixture with a solar panel, a battery being charged by the panel, a light source, and a mount for the light fixture;
   a sunlight adequacy indicator in the fixture for indicating an optimum charging condition for the battery, wherein locating the mount for the fixture changes the charging condition for the battery;
   a wireless protocol communication module configured to establish a wireless connection between the light fixture and a smartphone; and
   a smartphone app configured to receive data from the light fixture through the Bluetooth communication module, to notify the user of a low sunlight condition, and to display information including the daily charging rate and battery capacity.

11. The solar-powered light fixture indicating system of claim 10, wherein the smartphone app is further configured to display a graphical representation of sunlight exposure over time, including a daily breakdown of sunlight exposure for the past week, allowing the user to understand sunlight patterns and make informed decisions regarding the placement of the light fixture.

12. The solar-powered light fixture indicating system of claim 10, wherein the smartphone app provides real-time notifications to the user when the sunlight level falls below a predetermined threshold, and further allows the user to remotely adjust the light fixture's operational settings, such as brightness levels, based on the received sunlight data.

13. The solar-powered light fixture indicating system of claim 10, wherein the smartphone app includes a user interface to monitor historical data trends related to solar irradiance, battery health, and energy consumption, providing users with predictive analytics to optimize the placement and usage of the light fixture.

* * * * *